United States Patent
Gautier

[11] 4,225,887
[45] Sep. 30, 1980

[54] OPTICAL IMAGE ACOUSTO-ELECTRIC READING DEVICE

[75] Inventor: Hervé Gautier, Paris, France

[73] Assignee: Thomson-CSF, Paris, France

[21] Appl. No.: 972,521

[22] Filed: Dec. 22, 1978

[30] Foreign Application Priority Data
Dec. 26, 1977 [FR] France .................. 77 39200

[51] Int. Cl.$^2$ ............................ H04N 5/30
[52] U.S. Cl. ...................... 358/213; 358/201; 310/322
[58] Field of Search ........... 358/212, 213, 201; 250/211 J, 211 R, 578; 310/322; 365/103, 105, 112, 114

[56] References Cited
U.S. PATENT DOCUMENTS
4,084,192  4/1978  Defranould et al. ............... 358/213

*Primary Examiner*—Robert L. Richardson
*Attorney, Agent, or Firm*—Roland Plottel

[57] ABSTRACT

An acousto-electric analysis device for an optical image in one or two dimensions. It comprises a piezoelectric substrate and a semi-conductor substrate with a diode network on the face which is opposite the piezoelectric substrate. The optical image is projected on this face and causes each of the diodes to discharge as a function of the luminous intensity received at each point. A high frequency acoustic pulse, which propagates on the piezoelectric substrate, enables the diodes to be recharged by supplying a video signal representing the analysis of the image projected.

9 Claims, 8 Drawing Figures

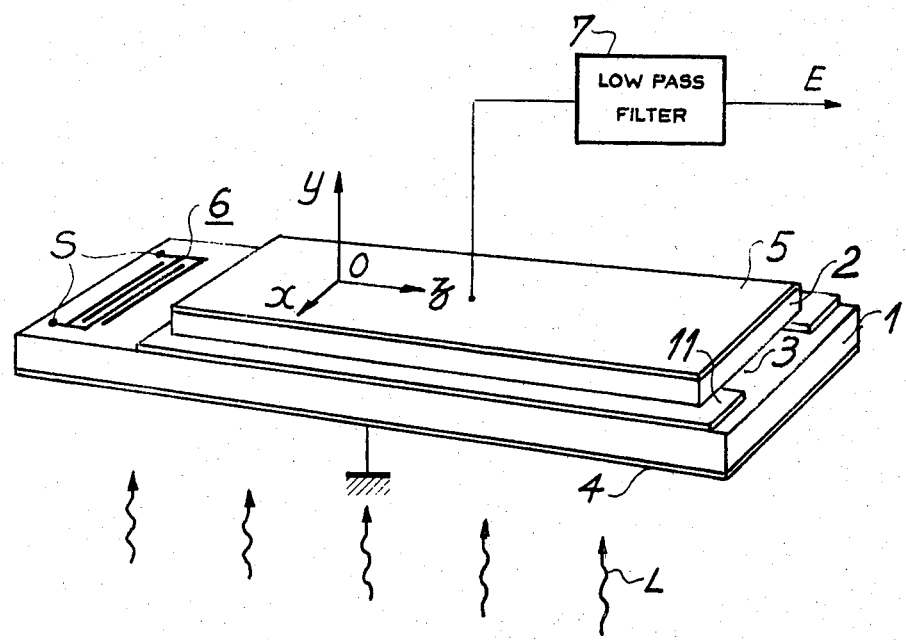
Fig_1
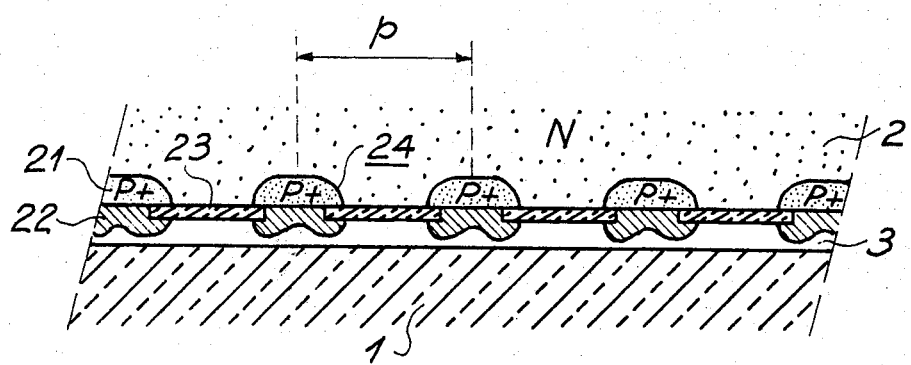
Fig_2

Fig_3-a
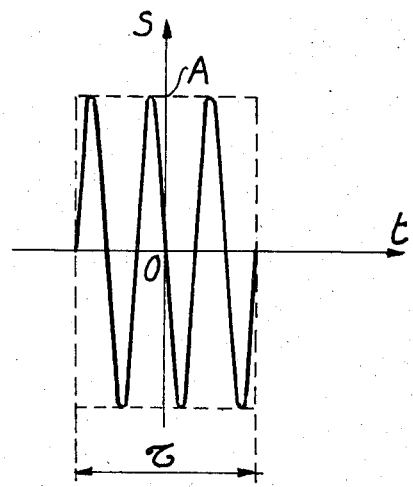
Fig_3-b
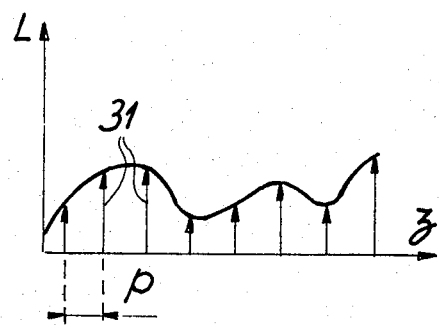
Fig_3-d
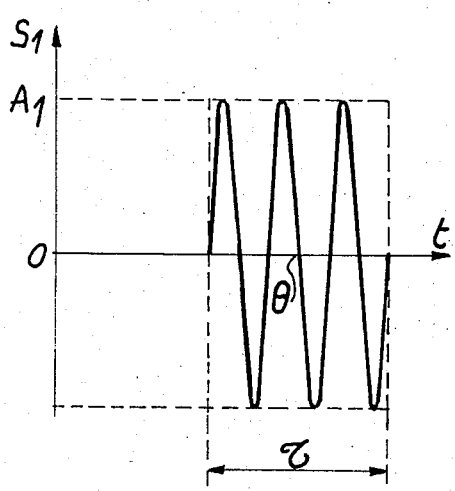
Fig_3-c
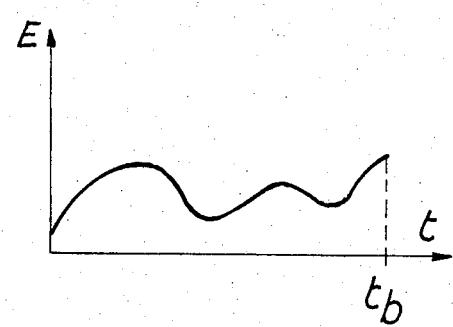

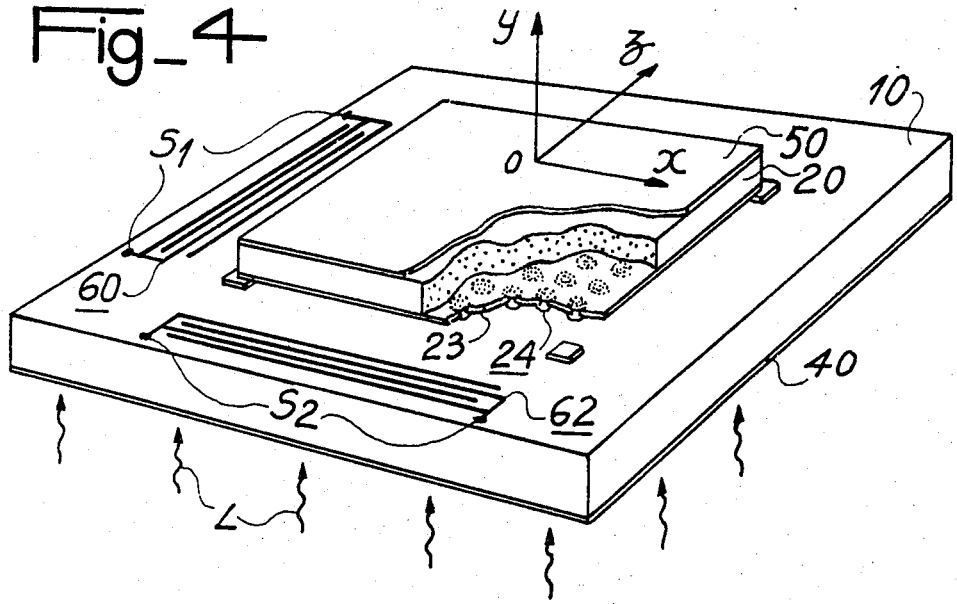
Fig_4
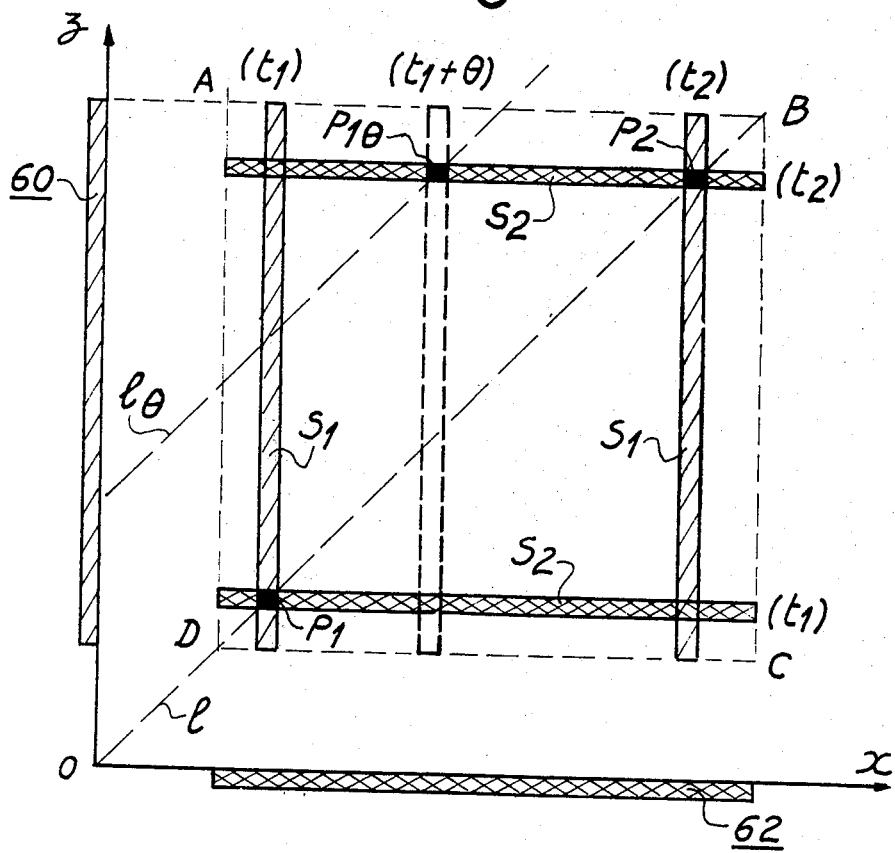
Fig_5

OPTICAL IMAGE ACOUSTO-ELECTRIC READING DEVICE

The present invention covers a device which reads an optical image electrically, using elastic surface waves.

It is known how to read optical images using elastic waves, which are also called acoustic waves, by means of non-linear interactions between two electrical fields for example, these fields being those which are associated with the deformations of a piezoelectric crystal at whose surface two elastic waves propagate. The signal representing this interaction may be the electric current which results from the interaction and flows through the semi-conductor. The image to be read is projected on the semi-conductor where, by modulating its conductivity spatially during an image integration phase, it modulates the intensity of the signal resulting from the interaction. Such a device is described in U.S. Pat. No. 4,122,495 in the name of Thomson-CSF for example.

It is an object of the invention to realize an acousto-electric reading device which is easy to make and in which a memory function accompanied by an improvement in sensitivity is introduced.

It is another object of the invention to realize a device usable for image reading in one or two dimensions.

According to the invention, there is provided an optical image acousto-electric reading device comprising:

a piezoelectric substrate on one of whose surfaces elastic waves are able to be propagated along a direction OZ, this surface being called the propagation surface, a semi-conductor substrate placed opposite the piezoelectric substrate propagation surface but not in contact with it, having a network of photosensitive memory elements on its face opposite the propagation surface, said optical image being projected on this network and causing a discharge of said memory elements which is a function at each point of the luminous intensity received from said image, means for emitting at least one train of pulse-shaped, high frequency elastic waves on said propagation surface, said wave train recharging said memory elements when it propagates along said direction OZ by supplying the corresponding recharging current, means for picking said current to form a video output signal corresponding to reading of said image.

For a better understanding of the invention and to show how it can be carried into effect, reference will be made to the following description, which is given as a non-limiting example and is illustrated by the attached figures showing:

in FIG. 1, a perspective view of an embodiment of a device in accordance with the invention, in FIG. 2, a partial section showing the memory elements used in the device in accordance with the invention, in FIG. 3, diagrams of signals used or supplied by the device in accordance with the invention, in FIG. 4, a perspective view of a way of another embodiment of the device in accordance with the invention, which enables images to be read in two dimensions, in FIG. 5, an explanatory schematic diagram of the preceding figure, In these various figures, the same references cover the same elements.

In FIG. 1 are shown mainly a piezoelectric substrate 1, of ZY cut, made of lithium niobate for example, and a semi-conductor, photosensitive substrate 2. These two substrates are placed opposite one another and separated one from the other by a thin dielectric layer 3, of air for example, substrate 1 having two extra thicknesses 11 for this purpose. Substrates 1 and 2 are parallelepipedal in shape, lengthened in the direction OZ, which is the direction of elastic wave propagation at the surface of substrate 1, and are preferably very thin along the direction OY, which is normal to the substrate surfaces that face one another. The material forming semi-conductor substrate 2 is chosen as a function of the device application field, i.e. the wave-length of the radiation carrying the image to be read: in the visible field, (N or P) silicon or gallium arsenide is used; in the infrared field, mercury and/or cadmium telluride, lead and tin telluride, indium antimonide or perhaps extrinsic silicon are used.

The device in FIG. 1 also contains:

a continuous electrode 5, called the signal electrode, which is placed on the face of substrate 2 which is not opposite substrate 1, a continuous electrode 4, called the ground electrode, arranged on the face of substrate 1 which is not opposite substrate 2, an electromechanical transducer 6, of the type with electrodes in the form of interdigited combs, which is placed at one end of piezoelectric substrate 1 not covered by substrate 2.

FIG. 2 shows a partial section of the device in FIG. 1 along a plane parallel to OZ.

In this figure may be found piezoelectric substrate 1 and semi-conductor substrate 2 separated by an air layer 3. Substrate 2 is of type N silicon for example.

Semi-conductor substrate 2, on the face which is opposite substrate 1, has a memory element matrix 24, formed in the embodiment shown by PN diodes. These diodes are formed by a P+ zone 21, produced in substrate 2 by diffusion or ion implant for example (a technique which is also known in the literature under the name of surface charge carrier trap implant); areas 21 are separated one from another by an insulating layer 23, of silicon oxide for example, which is deposited on the surface of substrate 2; areas 21 are covered with conducting plots 22. Diodes 24 are placed periodically at distances marked p.

The image to be read, which is represented by rays L in FIG. 1, is projected on the face of semi-conductor substrate 2 containing diodes 24 along an outline which describes a zone called the interaction zone hereafter. In the example shown, the image is projected on semi-conductor 2 through insulating layer 23 and substrate 1 which must be transparent and electrode 4, which must be transparent or semi-transparent.

FIGS. 3a to d show signals applied to the device or supplied by it.

FIG. 3a is the diagram as a function of time of an electric signal S applied to transducer 6. It is a sinusoidal pulse of length $\tau$, angular frequency $\omega$ and amplitude A, of roughly rectangular shape for example.

FIG. 3b shows an example of the linear distribution (along OZ) of the luminous energy L along the interaction zone. The arrows 31 represent the position of diodes 24 and are therefore at a distance p one from another. To make the figure clear, only a few arrows 31 are shown; in practice they are much more numerous and closer together, their distance p being at the most equal to the half length of the elastic wave.

The device shown in FIG. 1 operates as follows:

It is assumed that, at an initial time $t_o$, diodes 24 are uniformly charged to a value $Q_o$, i.e. a quantity of charges $Q_o$ (negative in the example in the figure) has been supplied by conduction in zones 21 (P zones) by a mechanism described further on; this charge $Q_o$ then reverse polarizes diodes 24 and is thus recorded in the memory.

It is known that this charge $Q_o$ then decreases at the level of each diode as a function of the diode inverse current which is a function of the illumination it receives: the decrease in charge is very slow in the dark and faster and faster when the luminous intensity increases. After time $t_1$, the quantity of charge $\Delta Q(z)$ lost by a diode, where $\Delta Q(z) = Q_1(z) - Q_0$ and $Q_1(z)$ is the quantity of charge remaining in the diode being considered, is of the order of the quantity of photons received in this diode:

$$\Delta Q(z) \alpha \phi(z) t_1 \qquad (1)$$

in which $\phi(z)$ is the photon flux received at the point $(z)$ being considered.

When pulse S is applied to transducer 6, the latter produces an elastic wave also alled S to simplify things, with the same angular frequency ($\omega$) and wave number k ($k = \omega/v$, where v is the elastic wave propagation velocity), which propagates along the surface of piezoelectric substrate 1 in the direction OZ and takes up a length $v\tau$. The electric field associated with the elastic pulse enables diodes 24 to be recharged sequentially as the pulse propagates along the direction OZ. The transient recharging current is proportional to the lack of charge $\Delta Q(z)$ in each diode and hence to the illumination in accordance with the relationship (1) above. This current is picked up between electrodes 4 and 5 and filtered by a low pass filter 7 in the frequency band $$(0 - \frac{1}{\tau})$$

to give the video signal marked E. This signal E is shown in FIG. 3c as a function of time: it is of the same shape as incident signal L and lasts for $t_b$ which is the time during which elastic pulse S sweeps the interaction zone.

It can be seen that, in this device, the passage of a single elastic wave enables the data to be read (i.e. the quantity $\Delta Q(z)$) and to recharge the diodes for the next sequence in the same way as what happens at a vidicon tube target, where an electron beam analyses the layer of charges present on it while recharging it for the next reading.

Also, the video signal (E) obtained is positive, i.e. it varies in the same direction as the illumination. This is an advantage with respect to a number of known systems using surface waves in which the reading obtained is "negative".

FIG. 4 shows a perspective view of another embodiment of the device in accordance with the invention, which allows the reading of images in two dimensions.

In this figure may be found:

a piezoelectric substrate, now roughly square in shape, marked 10 with a ground electrode 40 on its lower face, a transducer 62, which emits an elastic pulse $S_2$ along the direction OZ, where $S_2$ is identical to S except in amplitude ($A_2$).

a semi-conductor substrate, now also roughly square in shape, marked 20, with a square matrix of memory elements such as 24 on its lower face and a signal electrode 50 on its upper face.

The device also contains a second electromechanical transducer 60 which emits an elastic pulse corresponding to an electric signal $S_1$ in the direction OX.

Signal $S_1$ is shown in FIG. 3d: it is a sinusoidal pulse preferably of length $\tau$, of angular frequency $\omega_1$ preferably equal to $\omega$ and amplitude $A_1$. With respect to signal $S_2$, it has a delay $\theta$.

In operation, the image to be read is, as before, projected on the diode matrix through piezoelectric substrate 10 but by such means that the number of photons received before reading does not reduce the quantity of the initial charge ($Q_o$) by more than half.

Each of the transducers 62 and 60 emits an elastic pulse, $S_2$ and $S_1$ respectively. These meet on an elementary surface P, called a point, which is a square of side $\tau v$. At this point P is obtained the linear superimposition of the two elastic waves.

If the voltage corresponding to $Q_o$ is called $V_o$, amplitudes $A_2$ and $A_1$ of signals $S_2$ and $S_1$ are so chosen that the electric field associated with each of the pulses $S_2$ and $S_1$ corresponds to a potential at diode level of $V_o/2$ only. In this way, with the condition already laid down for $Q_o$ with respect to the incident illumination, it appears that the associated electric fields are insufficient to recharge the diodes except at point P where a potential equal to $V_o$ it obtained: hence the data is only read and the diodes recharged at point P.

As before, the video signal is picked up between the two external electrodes 40 and 50 and then amplified and filtered.

Reading of a point P has been described above. This point P sweeps the interaction zone in accordance with a procedure illustrated in FIG. 5, and described in U.S. Pat. No. 4,069,507 in the name of Thomson-CSF.

In FIG. 5 are shown the two transducers 60 and 62 which emit the elastic waves $S_1$ and $S_2$ along paths which are normal one to the other and define at their intersection ABCD an interaction zone which forms the useful surface on which the image to be read may be projected.

Pulses $S_1$ and $S_2$, which are emitted at time $t_1$ ($\theta = 0$), are shown: they meet at $P_1$. At time $t_2 > t_1$, the same waves cross at $P_2$. Point P describes an image analysis line $\rho$ which, when $\theta = 0$, bisects the angle formed by transducers 60 and 62 if the propagation velocity of the two waves at the piezoelectric substrate surface is the same.

To analyze the image in lines parallel to $\rho$, it is sufficient to vary the delay $\theta$ by positive and negative values. In the figure, a line $\rho_\theta$ is shown, which is described by the point $P_{1\theta}$ when $\theta$ is positive, i.e. in accordance with the presentation in FIG. 3, with $S_1$ delayed with respect to $S_2$.

As an example, an unidimensional reading device in accordance with the invention was made as follows:

an N type silicon substrate (2) with resistivity of the order of 10 ohms/cm, a network of PN type diodes about 20 mm long and 1.5 mm wide, the diode spacing being 12.5 $\mu$m, a lithium niobate substrate (1) in which the elastic wave propagation velocity (v) is about 3500 m/sec.

When pulse S whose length ($\tau$) is about 10 nsec is used, its band width is about 100 MHz. When the interaction zone sweep time is about 6 $\mu$sec and a resolution of 600 points per line is chosen, each point resolved corresponds to 2.7 diodes and a sensivity of about $10^{-2}$ $\mu W/cm^2$ for 25 images per second is obtained, which is the reading frequency usually used allowing for the fact that the device sensitivity is a function of the time separating two readings in succession.

Such a device, of simple structure and fully solid state, allows fast reading, of the order of a few microseconds, a memory recording of several seconds and, because, of its sensitivity, image reading at low light levels.

Evidently, the description above is only a non-limiting example and hence, in particular, the replacement of the PN type diodes by Schottky diodes, for example, to form the device memory elements is within the framework of the invention.

What is claimed is:

1. A two dimensional optical image acousto-electric reading device comprising:
    a piezoelectric substrate having a two dimensional propagation surface on which elastic waves are able to be propagated along a direction OZ and a non-parallel direction OX,
    a semi-conductor substrate placed opposite the piezoelectric substrate propagation surface but not in contact with it, and having a substantially similar two dimensional shape on the propagation surface, a two dimensional network of photosensitive memory elements on the substrate face opposite the propagation surface, said two dimensional optical image being projected on this network and causing a discharge of said memory elements which is a function at each point of the luminous intensity received from said image,
    means for emitting at least one train of pulse-shaped, high frequency elastic waves on said propagation surface, in the OZ direction and second means for emitting a second train of pulse shaped high frequency elastic waves on said propagation surface in the direction OX, said wave trains recharging said memory elements when they propagates along said direction OZ and OX and intersect by supplying the corresponding recharging current to the memory element at the location of intersection,
    means for picking said current to form a video output signal corresponding to reading of said image.

2. An optical image acousto-electric reading device comprising:
    a piezoelectric substrate on one of whose surfaces elastic waves are able to be propagated along a direction OZ, this surface being called the propagation surface,
    a semi-conductor substrate placed opposite the piezoelectric substrate propagation surface but not in contact with it, having a network of photosensitive memory elements on its face opposite the propagation surface, said optical image being projected, on this network and causing a discharge of said memory elements which is a function at each point of the luminous intensity received from said image,
    means for emitting at least one train of pulse-shaped, high frequency elastic waves on said propagation surface, said wave train recharging said memory elements when it propagates along said direction OZ by supplying the corresponding recharging current,
    means for picking said current to form a video output signal corresponding to reading of said image further comprising, the image being in two dimensions, means for limiting the discharge of said memory elements to a given value and means for emitting a further train of pulse-shaped, high frequency elastic waves on said propagation surface in a direction different from said direction OZ, the amplitude of the waves in both wave trains being such that the higher is less than said given value and their sum greater than said given value.

3. A device as in claim 2, wherein said memory elements are diodes.

4. A device as in claim 2, wherein said memory elements are arranged periodically at a distance (p) from one another which is less than or equal to a half wavelength of said elastic wave train.

5. A device as in claim 2, wherein said wave trains are two series of brief pulses, each of the pulses from one of said trains encountering a pulse from the other of said trains in a zone called point, said point moving along a straight line forming an analysis line of said image, a frame of substantially parallel lines being obtained by the variation of the delay of a pulse of one of said trains in respect with the corresponding pulse of the other of said trains.

6. A device as in claim 2, wherein said further wave train is of the same frequency, length and amplitude as the first one and is emitted in a direction (OX) normal to said direction OZ.

7. A device as in claim 2, wherein said image is projected on said semi-conductor substrate through said piezoelectric substrate.

8. A device as in claim 2, wherein said picking means are formed by two electrodes placed respectively on the faces of said two substrates which are not opposite one another.

9. A device as in claim 2, further comprising means for filtering and amplifying the signal picked up by said picking means.

* * * * *